United States Patent

[11] 3,633,046

[72] Inventor Cylde G. Dewey
Drexel Hill, Pa.

[21] Appl. No. 32,640
[22] Filed Apr. 28, 1970
[45] Patented Jan. 4, 1972
[73] Assignee General Electric Company

[54] PARALLEL THYRISTORS SWITCHING MATRICES
22 Claims, 3 Drawing Figs.

[52] U.S. Cl. .......... 307/252 Q, 307/252 L, 340/166
[51] Int. Cl. .......... H03k 17/00, H03k 17/56
[50] Field of Search .......... 307/252 L, 252 R; 340/166

[56] References Cited

UNITED STATES PATENTS

| | | | |
|---|---|---|---|
| 3,122,695 | 2/1964 | Meissen | 307/252 L |
| 3,218,476 | 11/1965 | Hansson | 307/252 L |
| 3,259,831 | 7/1966 | Dortort | 307/252 L |
| 3,267,290 | 8/1966 | Diebold | 307/252 L |
| 3,355,600 | 11/1967 | Mapham | 307/252 L |

*Primary Examiner*—Donald D. Forrer
*Assistant Examiner*—John Zazworsky
*Attorneys*—J. Wesley Haubner, Frank L. Neuhauser, Oscar B. Waddell, Joseph B. Forman and Barry A. Stein

ABSTRACT: Disclosed are solid-state switching matrices adapted to be serially connected to other such matrices to form an electric valve of a converter system. Each matrix comprises a plurality of thyristors connected in parallel paths to enable the matrix to conduct high current. Means are provided to maintain the requisite turn on anode voltage across any thyristor when its parallel mate begins conducting. Means are also provided to rapidly suppress any commutation transients which may arise upon turn on. In one embodiment of my matrix selected thyristors are triggered prior to others during each conducting interval of the matrix, whereas, in another embodiment the triggering order is alternated each conducting interval.

INVENTOR:
CLYDE G. DEWEY,
BY [signature]
ATTORNEY

INVENTOR:
CLYDE G. DEWEY,
BY Barry A. Stein
ATTORNEY

PARALLEL THYRISTORS SWITCHING MATRICES

BACKGROUND AND OBJECTS OF THE INVENTION

My invention relates generally to electric switching circuits and more particularly to high-current switching matrices adapted for forming an electric valve in a high-voltage electric power converter.

In modern practice such converters advantageously employ solid-state electric valves comprising coordinated arrays of semiconductor switching devices which will hereinafter be referred to as thyristors (also known generally as silicon controlled rectifiers or SCR's). Typically six such valves are arranged in a three-phase double-way bridge configuration having three separate AC terminals and a set of positive and negative DC terminals. By sequentially firing the six valves in proper order and in timed relationship with the voltage of the three-phase electric power system to which the AC terminals are connected, the flow of power between the AC and DC terminals can be controlled as desired.

As is known in the art, when connected to a source of voltage and a load, each thyristor in a valve will ordinarily block appreciable current flow between its anode and cathode until triggered or "fired" by the application thereto of a control signal (gate pulse) above a small threshold value at a time when its main electrodes are forward biased (i.e., anode potential positive with respect to cathode), whereupon it abruptly switches to a relatively low-resistance conducting state although some small voltage drop ($V_f$) remains across the device. The minimum forward bias voltage at which a thyristor can be successfully turned on with a trigger signal of reasonable magnitude is hereinafter referred to as $V_{on}$.

The time at which a valve is actually fired, measured in electrical degrees from a cyclically recurring instant at which its anode voltage first becomes positive with respect to the cathode, is known as the firing angle. Once a valve commences conducting forward current, it will continue in this state until its conducting interval is subsequently terminated each cycle by the transfer of current to a companion valve of the bridge due to line voltage commutation.

As is known in the art, individual thyristors which are commercially available today have current ratings that may be inadequate to meet the needs of high-power electric valves. Consequently, in constructing high-current valves it is desirable to connect a number of individual thyristors in parallel. Further, owing to the fact that the maximum forward and reverse voltage blocking ratings of commercially available thyristors are still much lower than required for very high voltage applications, a plurality of parallel-thyristor sections are needed in series. In practice such valves will therefore comprise a plurality of serially connected duplicate switching circuits or building blocks (hereinafter referred to as matrices) each of which is constructed of a plurality of thyristors arranged in parallel paths.

While theoretically all of the thyristors that are paralleled in such a matrix can be simultaneously triggered, there is in practice a real possibility that one will turn on or fire slightly before the remainder due to inherent differences in their turn-on times. A spread of turn-on times is typical among ordinary thyristors on the market today. When one turns on ahead of the others the forward voltage on the latter thyristors then collapses and becomes equal to the low forward drop across the first one fired. Usually the thyristor with the lowest turn-on voltage ($V_{on}$) tends to turn on first. Unless and until the forward voltage across this thyristor exceeds the turn-on voltage of the slower thyristors, the rest of the parallel combination will not turn on. Any appreciable delay in turning on of the slower thyristors might result in failure of the first fired thyristor if the imposed change in current magnitude with respect to time (*di/dt*) is more than the first device can safely absorb. Further, if this delay lasts longer than the duration of the trigger signal, the slower devices will never turn on. In such an event the first-on thyristor will be forced to carry the entire load current throughout the conducting interval instead of merely its proportional share. Consequently, it becomes apparent that means must be provided to insure that all the devices do in fact turn on in order to share the load current then flowing.

Prior disclosures of directly paralleled thyristors in high-current switching arrays have proposed the use of individual thyristors that are carefully graded and selected for uniform characteristics of significance. For example, it has been essential to select thyristors having closely matched delay times, anode breakdown voltage at turn-on, and forward drop vs. current loading and temperature curves. Without access to devices that have been uniquely designed for this purpose, the grading and selection process is difficult and expensive and has other recognized limitations such as the problem of replacing a failed thyristor in service.

Whenever the valves in a converter are triggered at relatively late firing angles, commutation begins at a time when the relevant phase-to-phase voltage of the AC system is near its crest magnitude. At this point in time there is an extra high level of energy stored in the stray capacitance of the connected system and severe commutation transients can be expected, which transients should be suppressed quickly in order to preclude or minimize the chance of damage to any thyristors which are then conducting.

It is a general object of this invention to provide an improved high-current parallel-thyristor switching matrix wherein safe turn-on of all thyristors is assured.

It is a further object of this invention to provide a high-current parallel-thyristor switching matrix wherein a group of thyristors whose characteristics may differ slightly from one another can nevertheless be reliably turned on in order to properly divide the total load current among a plurality of parallel current paths.

A further object of this invention is the provision, for a high-voltage electric valve, of an improved high-current switching matrix using parallel arrays of commercially available thyristors and adapted for rapidly suppressing initial commutation transients while ensuring successful turn-on of all of the thyristors.

SUMMARY OF THE INVENTION

In one aspect of my present invention, I provide a high-current switching matrix adapted to be serially connected to other such matrices to form a high-voltage asymmetrically conductive electric valve that can be coupled to an alternating voltage power system having a predetermined stray capacitance. Each matrix comprises first and second load current conducting paths connected in parallel between the main electrodes thereof. Each of these paths in turn comprises a plurality of serially connected thyristors, and means are provided for connecting each thyristor in the first path in parallel circuit relationship with a corresponding thyristor in the second path of the matrix. Another duplicate pair of parallel paths may be added to the matrix if desired.

To ensure successful switching of this matrix, one thyristor (called a first-on thyristor) of each parallel array is deliberately triggered slightly ahead of its mate, and means is provided to ensure that forward bias voltage across the parallel mate (called a last-on thyristor) is maintained above a turn-on valve ($V_{on}$) notwithstanding collapse of voltage across the "first-on" thyristor before the "last-on" thyristor is triggered. In one embodiment of the invention, the last-mentioned means comprises, for each different group of four thyristors, a series resistor-inductor (R–L) subcircuit which is connected between a juncture of one pair of adjoining series thyristors in the aforesaid first path of the matrix and a juncture of the corresponding pair of thyristors in the second path. As so connected, two closed circuit loops are provided, with each loop comprising a first-on thyristor, a last-on thyristor, and an R–L subcircuit (the R–L subcircuit being common to the two loops), and the first-on thyristors are staggered so that in the respective loops they lie in different paths.

Upon simultaneously triggering all of the "first-on" thyristors in the matrix, current begins flowing between the main electrodes via a circuit consisting of the first-on thyristors and the interconnecting R–L subcircuit. The voltage drop across the subcircuit, while the initial current is passing therethrough, is impressed as forward bias voltage on the other thyristors which are later triggered. During the period of initial matrix current flow, the subcircuit resistor serves to dampen transient current oscillations, while the subcircuit inductor limits initial discharge current contributed by the system stray capacitance and absorbs a large portion of the energy stored therein.

After a brief period of time, the voltage on the system stray capacitance will have decreased to a sufficiently low level to insure safe turn-on of the remaining or "last-on" thyristors, and the latter are triggered in unison whereupon matrix current will flow through both of the aforesaid parallel load current conducting paths but not through the R–L subcircuit. In order to effectuate proper current division among the parallel paths, a balancing inductor is provided in series in each path. Further, in order to dissipate any energy stored in the current balancing inductors when the matrix is being commutated off at the end of its normal conducting interval, a resistor is placed in shunt with each of the balancing inductors.

In the interest of economy a saturable core inductor is used in the R–L subcircuit. This inductor tends to saturate during the above-summarized operating cycle. Therefore, unless its core is subsequently reset (driven out of saturation), the inductor may be unable to adequately limit the initial matrix current or maintain sufficient forward bias voltage on the last-on thyristors during succeeding similar cycles. In order to reset the core, I provide for alternate sequential thyristor triggering wherein the order of turn-on is reversed each cycle. Thus, the aforesaid last-on thyristors are actually triggered first during alternate cycles. In so doing the initial matrix current will flow through the R–L subcircuit in one direction one cycle and in the opposite direction on the next successive cycle, thereby resetting the core each cycle.

In another embodiment of my invention, the need for an alternate triggering scheme is obviated by a different arrangement of the first-on thyristors and the R–L subcircuit. In this embodiment, all of the first-on thyristors and a parallel R–L subcircuit are interconnected in series to form an initial current circuit that also serves as one of the load current conducting paths between the main electrodes of the matrix. The subcircuit comprises a saturable core inductor which is shunted by a resistor in series with a diode poled in opposition to the thyristors in the first path. A plurality of additional load current paths, hereinafter referred to as the follow up paths, are connected in parallel with the first path, and each comprises a plurality of serially connected thyristors and a current balancing inductor.

Upon simultaneously triggering all of the first-on thyristors of this matrix, through current begins flowing via the first path wherein the saturable core inductor serves to limit the magnitude and rate of rise of the initial current, thereby protecting the conducting thyristors from thermal damage. The voltage across the saturable core inductor (which is effectively in shunt with the follow up paths during conduction of the first path) ensures adequate forward bias on the subsequently triggered thyristors in the follow up paths notwithstanding the collapsing voltage across the first-on thyristors. The subcircuit resistor acts to dampen any transient current oscillations produced during the initial discharge of the system stray capacitance energy.

After the elapse of a short period of time, during which most of the system stray capacitance energy is absorbed in the turn-on path, the follow up thyristors are triggered in unison. In the event that one or more of the follow up paths becomes wholly turned on before the remainder, the current balancing inductor(s) therein will prevent premature collapse of the forward bias voltage across the last path to turn on. Further, in the event that certain thyristors in any of the follow up paths begin conducting prior to their respectively parallel mates, voltage is maintained across the latter by resistance means which interconnect the junctures of adjoining thyristors in the respective paths.

BRIEF DESCRIPTION OF THE DRAWINGS

This invention will be better understood and its various objects and advantages will be more fully appreciated from the following description taken in conjunction with the accompanying drawings in which.

DESCRIPTION OF SPECIFIC EMBODIMENTS

Figure 1:
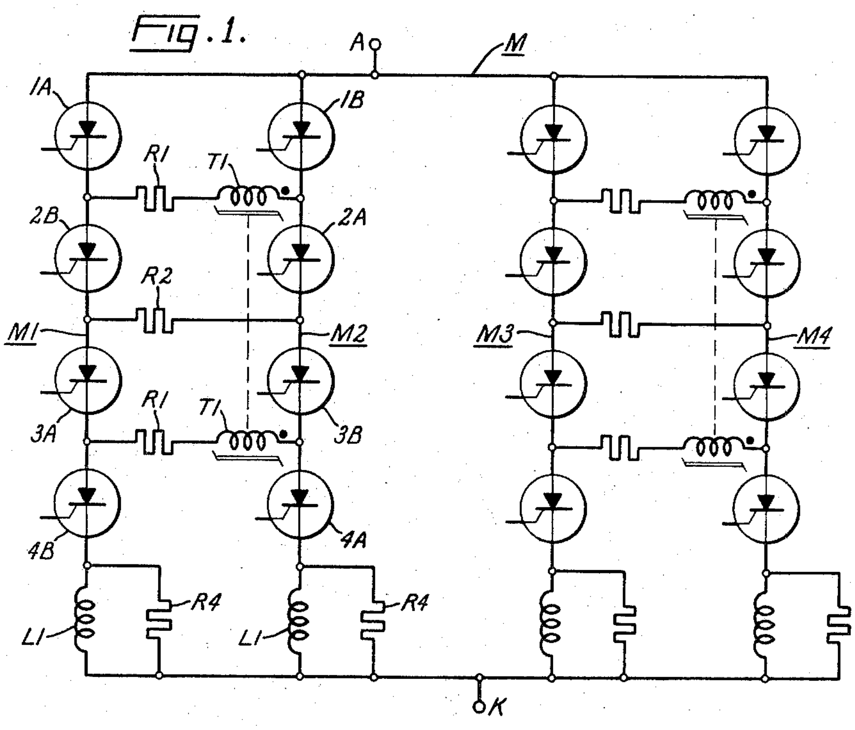
FIG. 1 is a schematic circuit diagram of a high-current thyristor matrix embodying my invention.

FIG. 1 is a schematic circuit diagram of a switching matrix M which is adapted to be serially connected to other such matrices in order to form a high-voltage solid state asymmetrically conductive electric valve which in turn is adapted to conduct current of high magnitude between external source and load circuits. The illustrated matrix comprises a plurality of parallel paths M1, M2, M3 and M4 arranged in duplicate pairs for conducting load current from a main electrode A (the anode) to another main electrode K (the cathode) at opposite ends of the matrix. Each of the parallel paths is composed of at least two thyristors which are connected in series with and poled in agreement; for example path M1 comprises four serially interconnected thyristors 1A, 2B, 3A, and 4B as shown. In addition, each path includes a current balancing inductor L1 (whose function will be described later). In practice the actual number of thyristors in each path depends on the desired voltage rating of the matrix, and the number of pairs of parallel paths depends on the desired current rating. Since the right-hand pair of paths M3 and M4 has the same circuitry and operation as the left-hand pair M1 and M2, only the latter is described in detail hereinafter.

The illustrated matrix is intended to be periodically switched on and off in unison with the companion matrices (not shown) that are part of the same valve. At the beginning of each forward current conducting interval, the matrix is turned on by applying trigger signals to the gates of the individual thyristors, and at the conclusion of conduction the matrix is turned off by line voltage commutation or the like. As was previously mentioned, the concurrent turn on of parallel thyristors is sometimes unreliable, and I have accordingly provided circuitry to insure that when triggered all the matrix thyristors will eventually conduct even if some commence conducting slightly sooner than others. This is accomplished by deliberately turning on selected thyristors ahead of others in parallel therewith and then controlling the forward bias voltage across the latter to ensure their conduction when subsequently triggered. In FIG. 1 the "A" thyristors (1A, 2A, 3A, and 4A) have been selected to be triggered prior to the "B" thyristors (1B, 2B, 3B and 4B) during one cycle of operation.

As can be seen in FIG. 1, a subcircuit comprising a resistor R1 in series with a saturable core inductor T1 is connected between the juncture of the upper pair of thyristors 1A and 2B of path M1 and the juncture of the corresponding thyristors 1B and 2A of the parallel path M2. Similarly, a duplicate subcircuit is connected between the juncture of the lower pair of thyristors 3A and 4B of path M1 and the juncture of the respectively corresponding thyristors 3B and 4A of path M2. A resistor R2 is connected between the juncture of thyristors 2B & 3A of path M1 and the juncture of thyristors 2A & 3B of path M2.

When it is desired to initiate conduction by the matrix M, all of the "A" thyristors are simultaneously triggered while forward voltage is impressed on the matrix, whereupon matrix current will begin flowing between the electrodes A and K through an initial circuit comprising thyristor 1A, resistor R1, inductor T1, thyristor 2A, resistor R2, thyristor 3A, resistor R1, inductor T1, thyristor 4A, and current balancing inductor L1. The voltage that was previously forward biasing the thyristors 1A and 2A collapses across these first-on thyristors as soon as they start to conduct, but at the same time a substantial voltage will appear across the associated R1–T1 subcircuit. It will be observed that the R1–T1 subcircuit, the thyristor 1A and the thyristor 1B form a closed loop, and therefore the voltage across the R1-T1 subcircuit when thyristor 1A conducts will forward bias the parallel thyristor 1B. Similarly, the other R1–T1 subcircuit will maintain substantial forward bias voltage across thyristor 4B when 4A turns on. With the first-on thyristors 2A and 3A conducting, the voltage drop across resistor R2 in the initial current circuit adds to the voltage appearing across each of the R1–T1 subcircuits thereby augmenting the forward bias voltage impressed on the respectively parallel mates 2B and 3B. Preferably the resistance of R2 is much less than that of R1, and most of this voltage will be supported by the R1–T1 subcircuit. It can now be appreciated that sufficient anode voltage is maintained on the last-on or "B" thyristors to prime them for conduction when subsequently triggered.

Upon conduction of the "A" (first-on) thyristors, a portion of the energy stored in the stray capacitance of the external system to which the matrix is electrically coupled will be dissipated in the aforementioned initial current circuit by the resistance therein. The value of the R1 resistors is chosen to dampen oscillations and thereby to prevent the initial matrix current from reversing (which would risk premature quenching of the valve) while nevertheless allowing the stray capacitance to discharge appreciably. This insures that when the "B" (last-on) thyristors later conduct they will not be exposed to unreasonably high energy dissipation duty. The energy that the first-on thyristors are exposed to is limited by the inductors T1 and L1 which prevent excessively high magnitude and rate of rise of the initial current flowing through the matrix. However, at the time when the remaining thyristors ("B" thyristors) are triggered the matrix current then flowing will tend to remain in the inductive elements long enough to allow the "B" thyristors to become fully conducting. Furthermore, a major portion of the stray capacitance energy will have been absorbed so that the voltage across the valve is much reduced from its initial value.

After a predetermined short delay that permits the stray capacitance voltage to drop to a sufficiently low level, all of the remaining thyristors 1B, 2B, 3B and 4B are triggered in unison, whereupon each of the parallel paths (M1 and M2) can conduct a portion of the total matrix current then flowing between electrodes A and K. Successful turn on of the "B" thyristors is ensured because of the ample forward bias voltage maintained across these last-on thyristors by the R1–T1 subcircuits and the resistor R2 in the initial current circuit, but once conduction begins in these thyristors the latter interconnections are effectively out of the load current paths and accordingly have no further effect on the operation of the matrix during its forward current conducting interval. With all of the matrix paths conducting, the current balancing inductors L1 serve to maintain and ensure approximately equal current sharing irrespective of slight voltage differences across the thyristors in the respective paths.

When the matrix M is subsequently commutated off (by the action of an incoming bridge valve being rendered conductive), any energy stored in the current balancing inductors L1 will be dissipated in a controlled manner by the resistance elements R4 which are placed in shunt with each of these inductors, thereby precluding excessive voltage transients.

In the interest of economy, each of the inductors T1 in the initial current circuit is preferably of the saturable core type (although linear inductors may be utilized if desired). In order to promote equal voltages across both of these inductors in the illustrated matrix, they preferably share a common saturable core. The relative polarities of the windings on the core are shown by conventional dot notation in FIG. 1.

Figure 3:
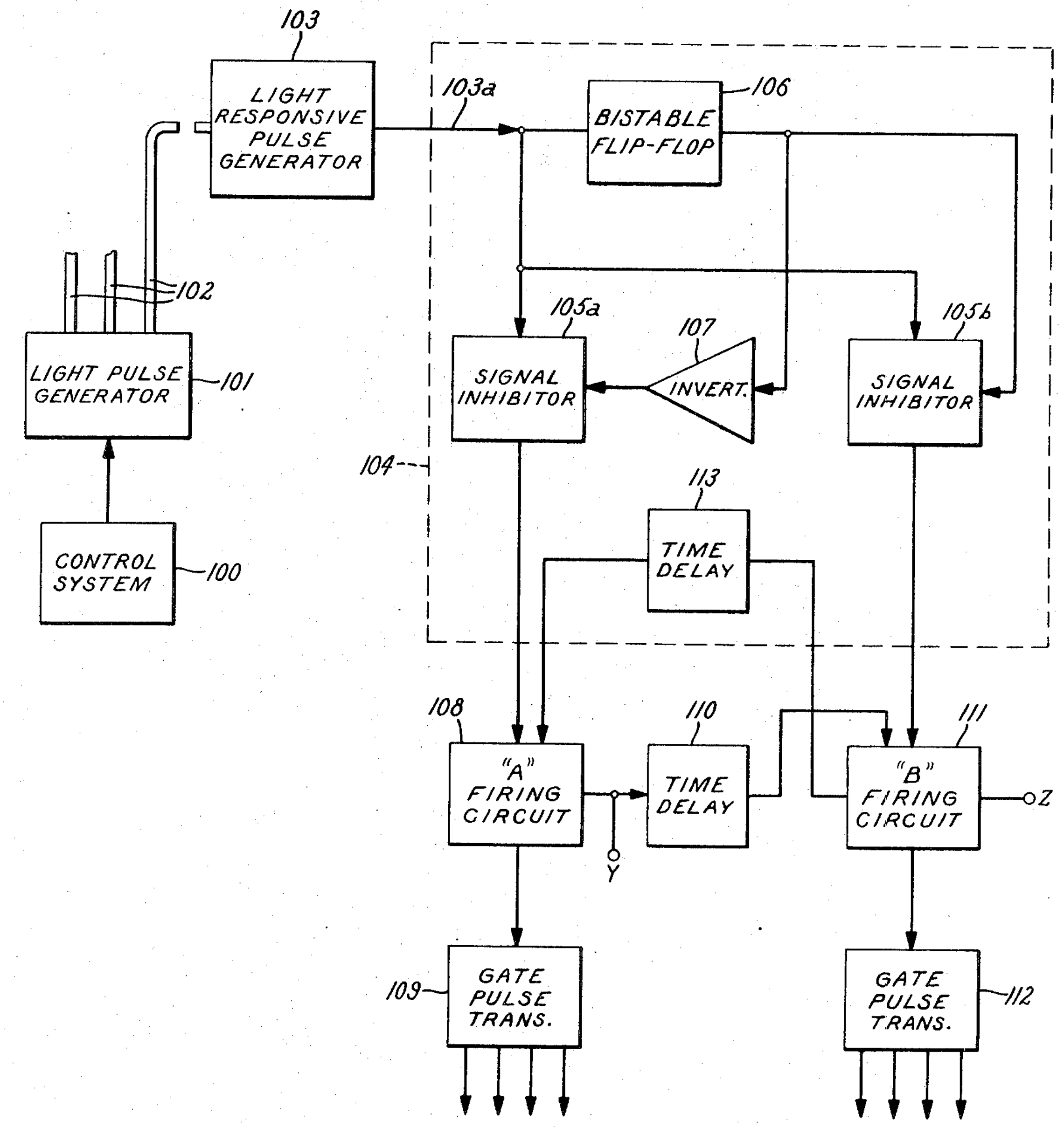
FIG. 3 is a functional block diagram of a thyristor triggering system that can be used with the matrix of FIG. 1 or the matrix of FIG. 2.

If the "A" thyristors of the matrix M were always turned on first during successive operating cycles, the saturable core inductors T1 would tend to saturate unless there were some means for resetting their core prior to conducting initial matrix current twice in the same direction. Saturation is undesirable because it would adversely affect the ability of these inductors to (1) properly absorb sufficient stray capacitance energy and (2) maintain sufficient anode voltage on the last-on thyristors. In order to reset the core, the "A" thyristors (which were triggered first to initiate the previously described operating cycle) are triggered last during alternate cycles. Thus, in the second (and fourth, sixth, etc.) cycle the initial current circuit between the electrodes A and K comprises thyristor 1B, inductor T1, resistor R1, thyristor 2B, resistor R2, thyristor 3B, inductor T1, resistor R1, thyristor 4B, and current balancing inductor L1. It can, therefore, be appreciated that the direction of initial current flow through the T1 inductors and the polarity of the voltage thereacross will now be reversed from the previous cycle, thereby effectively resetting its core. Subsequently, after a short time delay, all of the remaining thyristors ("A") are triggered and will commence conducting. The forward bias voltage that the R1–T1 subcircuits had maintained across these last-on thyristors ensures their successful turn on. A control circuit for providing alternate sequential triggering signals to the "A" and "B" thyristors of the matrix M during successive cycles is shown in FIG. 3 and will be discussed in detail later.

Should linear inductors be utilized in lieu of saturable core inductors T1, then the need for the above alternate sequential triggering scheme will be obviated. However, the saving in avoiding alternate triggering is probably less than the expense of using linear inductors instead of saturable core inductors.

Figure 2:
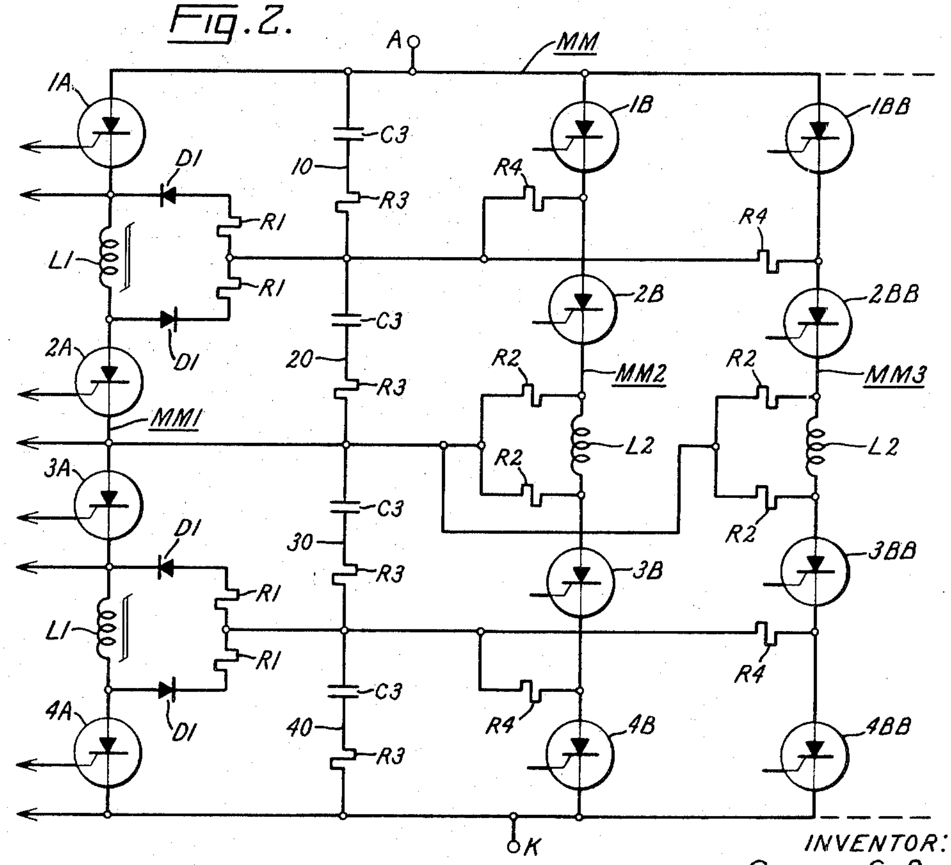
FIG. 2 is a schematic circuit diagram of another species of my invention.

FIG. 2 is a schematic circuit diagram of a switching matrix MM which illustrates another embodiment of my invention. Like matrix M, matrix MM is also adapted to be serially connected to other such matrices in order to form a high-voltage, high-current electric valve.

As can be seen, matrix MM comprises a plurality of parallel paths MM1, MM2 and MM3 etc., connected between a pair of main electrodes A and K for conducting load current through the matrix. Each of these paths comprises a plurality of thyristors which are connected in series and poled in agreement. This first path MM1, hereinafter called the "turn-on" path, preferably includes four "A" or "first-on" thyristors 1A, 2A, 3A & 4A. There is a saturable core inductor L1 at the juncture of thyristors 1A and 2A, and another such inductor is similarly interposed between thyristors 3A and 4A. In shunt with each of said inductors is a combination of two diodes D1 in series with two resistors R1, with all of these diodes being poled in opposition to the "A" thyristors. Thus two parallel resistor-inductor subcircuits R1–L1 are included in the illustrated turn-on path MM1.

Paths MM2 and MM3, hereinafter called the "followup" paths of the matrix MM, each includes a plurality of serially connected thyristors and a current balancing inductor L2. Although there are only two followup paths shown in parallel with the turn-on path, it is, of course, to be understood that more can be added for higher current ratings. For example, if three followup paths are desired, an additional path can be connected in parallel with paths MM2 and MM3 (this is depicted graphically by the dotted lines in FIG. 2). Followup path MM2 comprises thyristor 1B, thyristor 2B, balancing inductor L2, thyristor 3B and thyristor 4B, while followup path MM3 comprises thyristor 1BB, thyristor 2BB, balancing inductor L2, thyristor 3BB and thyristor 4BB.

In shunt with each of the balancing inductors L2 is a pair of serially connected resistance elements R2 (whose function will be considered later). A circuit or wire is shown connected from the common point between each of these pairs of resistors R2 to the junction of the middle two adjoining thyristors 2A and 3A in the turn-on path MM1.

The common juncture of the adjoining thyristors 1B and 2B in the followup path MM2 is connected to the R1–L1 subcircuit between adjoining thyristors 1A and 2A in the turn-on path MM1 by a circuit that includes resistance means R4 (whose function will be considered later). Preferably this connection is made to the common point between the two resistors R1, as is shown in FIG. 2. Another resistance means R4 is connected between the same common point and the juncture of thyristors 1BB and 2BB in path MM2. Similarly the common point between the R1 resistors in the R1–L1 subcircuit between thyristors 3A and 4A is connected to the respective junctures of 3B–4B and 3BB–4BB by two other resistance means R4.

In order to insure proper division of the applied voltage when the switching matrix MM is not conducting, series resistance-capacitance subcircuits are used in shunt with the respective arrays of parallel thyristors. Each of the R–C subcircuits comprises a resistor R3 in series with a capacitor C3. As can be seen, one of these R–C subcircuits (10) is connected between the anode A of the matrix MM and the common point between the two resistors of the first R1–L1 subcircuit in the turn-on path MM1, another R–C subcircuit 40 is connected between the cathode K of the matrix and the common point between the two resistors R1 of the other R1–L1 subcircuit, and the remaining R–C subcircuits 20 and 30 are serially connected between 10 and 40 with their common point being directly connected to the junction of thyristors 2A and 3A.

The matrix MM is intended to duplicate the previously described matrix M in rating and in function. In order reliably to turn on the several parallel load current conducting paths comprising matrix MM, the "A" thyristors in the turn-on path MM1 are always triggered ahead of the remaining followup path thyristors, hereinafter called the "B" thyristors (since all of these thyristors are designated by reference characters having either a B or a BB suffix), and the L1–R1 subcircuits in the turn-on path will maintain sufficient forward bias voltage across the "B" thyristors to ensure that they will commence conducting when subsequently triggered.

In operation, the four "A" thyristors while forward biased are simultaneously turned on by the triggering system shown in FIG. 3 (which will be described in detail later), whereupon these first-on thyristors in circuit with the two L1–R1 subcircuits conduct initial current through the matrix MM. The unsaturated inductors L1 limit the magnitude and rate of rise of the initial current, and the voltage previously blocked by the "A" thyristors is now absorbed by these inductors. Upon conduction of the turn-on path MM1, the associated capacitors C3 begin to discharge and the energy stored in the stray capacitance of the external system to which the matrix is coupled will be released through the conducting path, resulting in an oscillatory transient current. The oscillatory stray capacitance discharge current rapidly peaks and then begins to decrease, whereupon each of the inductors L1 applies a forward bias to the respectively associated diodes D1 in a circulating conducting path made up of inductor L1, diodes D1 and resistors R1 wherein the portion of the stray capacitance energy that was earlier transferred to L1 can be effectively dissipated. The ohmic value of the R1 resistors is chosen to overdamp this oscillation in order that the turn-on transients are suppressed quickly to protect the valve from being quenched prematurely. At the same time, the stray capacitance discharges completely and then begins to recharge with the opposite polarity to a level of voltage equal to the cumulative voltage drop across the series resistors R1. This reverse voltage might tend to turn off the presently conducting "A" thyristors (depending on their inherent recovery characteristics). Therefore, the gate signal to the "A" thyristors is maintained, so that when the stray capacitance is again recharged in the positive direction, any "A" thyristor which may have previously turned off will come on again.

When a fixed short time delay has elapsed after the "A" thyristors are triggered and ideally just prior to the time that the spray capacitance of the external system is recharged in the positive direction, all of the "B" thyristors in the matrix MM are triggered in unison. When the stray capacitance voltage is recharged to a sufficient positive level, the L1 inductors in the turn-on path MM1 will support ample forward bias voltage across the parallel followup paths of the matrix to enable the respective "B" thyristors to commence conducting.

When all of the last on "B" thyristors are actually conducting, there are three parallel paths (namely MM1, MM2 & MM3) for conducting load current through the illustrated matrix, with each path conducting a share of the total load current. In this regard it is my objective to have the L1 inductors saturate just before the "B" thyristors turn on so that each conducting path (the turn-on and followup paths) has approximately the same total inductance whereby current flow will be equally distributed. However, I have found that if the firing angle is very small the L1 inductors will not have time to completely saturate before the followup paths are triggered into conduction. In such an event the turn-on or "A" path may not be utilized to its full current carrying capability, but it can nevertheless conduct a useful portion of the total load current.

If one of the followup paths in the matrix MM were to begin conducting prior to any of the others, the matrix voltage will be sustained by the L2 inductor in that path, thereby insuring that the other followup paths have sufficient forward bias voltage to enable each of their respective thyristors to successfully complete its turn-on process.

In the event that one of the "B" thyristors in a followup path turns on prior to its parallel mates in the other followup paths, the resistance means R4 will maintain sufficient anode voltage on the latter thyristors to ensure their successful conduction. For example, should thyristor 1B begin conducting before thyristor 1BB, the voltage previously blocked by thyristor 1B will now appear across the R4 resistor which connects the cathode of thyristor 1B to the junction between the voltage dividing subcircuits 10 and 20, and the latter voltage will also be impressed across thyristor 1BB. Consequently, one can see that notwithstanding the collapse of voltage across thyristor 1B, the resistance means R4 will maintain sufficient forward bias voltage across thyristor 1BB to enable it to turn on.

When the matrix MM is commutated off at the conclusion of its forward current conducting interval, it will momentarily conduct reverse current. This is the reverse recovery current that flows through the thyristors while they are regaining their blocking states. The cessation of reverse recovery current can be very sudden, and damaging voltage transients might then be produced by the current balancing inductors L2 in the followup paths MM2 and MM3 except for the provision of the resistors R2 in shunt with each of said inductors to dissipate any energy stored therein. Insofar as the turn-on path is concerned, line voltage commutation causes inductors L1 to begin desaturating. Through current rapidly decays to zero and momentarily reverses thereby effectively turning off the path thyristors. The magnitude of the forward current in inductor L1 tends to decrease more slowly thereby generating a sustaining voltage which forward biases diodes D1. Now current can coast in each of the respective loops comprising inductor L1, diodes D1 and resistors R1, until the latter elements ultimately dissipate the energy stored in inductor L1. When inductors L1 cease to conduct current, it is important that their saturable cores be reset to insure that these inductors will be in a suitable state to perform their function during a subsequent cycle. This result is automatically achieved if suitable airgaps are provided in the cores. Alternatively, separate means (not shown) could be used for driving the cores out of saturation.

With reference to FIG. 2, a list of parameters for matrix MM will now be set forth for purposes of illustrating its operation. The illustrated matrix is typically assigned a rating of 2,500 volts and 1,800 amperes DC. It is assumed that the connected power system has a stray capacitance of 0.35 microfarads per matrix in the incoming valve, and that the power system has a commutating reactance of approximately 700 microhenries per matrix.

| Components: | Approximate Value |
|---|---|
| L1 (unsaturated) | 100 microhenries (at 60 Hz.) |
| L1 (saturated) | 20 do |
| L2 | 30 do |
| R1 | 1 ohm |
| R2 | 5 ohms |
| R3 | 15 do |
| R4 | 5 do |
| C3 | 5 microfarads |

Thyristors—G.E. Model No. 6RW54, rated 1,700 PRV, 500 A (average)

As was previously noted, both matrices M & MM require a sequential firing scheme (wherein one group of thyristors is triggered before the remaining group during one operating cycle), and matrix M further requires alternate triggering (wherein the group of thyristors fired first during one cycle is fired last during the immediately succeeding cycle). Any suitable means can be used for this purpose. By way of example, I have illustrated in FIG. 3 a control scheme which, with slight modification, can be utilized to provide alternate sequential triggering to matrix M of FIG. 1 or sequential triggering to matrix MM of FIG. 2. This triggering means is shown in functional block diagram form in FIG. 3.

As can be seen therein, the illustrated scheme preferably comprises a suitable control system 100 for cyclically activating a light pulse generator 101 at a desired firing angle. The light pulse generator includes a common source of light for a plurality of light responsive pulse generators 103 (only one of which is shown) that are respectively associated with the series-connected individual matrices comprising one high-voltage valve. The optical signal generated by light pulse generator 101 is transmitted to all of the light responsive pulse generators via a plurality of light guides 102, only three of which are shown in FIG. 3. The light responsive pulse generator 103 for each matrix is part of a local gate drive circuit that is capable of simultaneously applying gating current signal pulses to the gates of selected thyristors in the matrix in response to the reception of the light signal.

In supplying gate pulses to the thyristors comprising matrix M of FIG. 1, the output 103*a* of the light responsive pulse generator 103 is fed to a logic circuit 104. The function of the logic circuit is to insure that during one cycle of operation the output 103*a* causes (1) gate pulses to be transmitted without appreciable delay to the gates of the "A" thyristors; and (2) additional gate pulses to be transmitted with delay to the gates of the "B" thyristors, while insuring that during the next successive cycle the sequence of operation is reversed.

As can be seen, the output pulse 103*a* of generator 103 is fed to a pair of signal inhibitors 105*a* and 105*b* (which then actuated inhibit the passage of any signal therethrough) and to a flip-flop 106. The output of flip-flop 106 feeds an inhibiting signal to inhibitor 105*a* via a signal inverter 107 while feeding an inhibiting signal to inhibitor 105*b* directly. During each cycle of operation the output of generator 103 is fed to both inhibitors 105*a* and 105*b*. During one cycle a "1" output from flip-flop 106, inverted by 107 to a "0" signal at the inhibitor 105*a*, enables the output pulse 103*a* to pass through inhibitor 105*a*, whereas the same flip-flop output activates the companion inhibitor 105*b* which consequently prevents passage of the output pulse 103*a*. The pulse passing through inhibitor 105*a* is supplied to an "A" firing circuit 108 where it is amplified and shaped. This operation of the firing circuit 108 immediately energizes the primary of a multisecondary gate pulse transformer 109 whose secondaries are utilized to provide simultaneous gate pulses to all of the "A" thyristors in matrix M. At the same time that the inhibitor 105*a* supplies a pulse to the "A" firing circuit, an associated time delay circuit 110 is activated. Subsequently, after a predetermined short time delay (e.g., 20 $\mu$s) the time delay circuit 110 feeds a signal to the "B" firing circuit 111. This circuit being identical to circuit 108 also serves to amplify and shape the transmitted signal. Its delayed operation energizes the primary of another multisecondary gate pulse transformer 112 whose secondaries are utilized to provide simultaneous gate pulses to all of the "B" thyristors in matrix M. Although only four outputs are shown from each transformer in FIG. 3, in practice the number of outputs will depend upon the number of matrix thyristors to be triggered.

During the next successive operating cycle of the control scheme, the flip-flop 106 produces a "0" output signal which, when inverted by inverter 107, will actuate the inhibitor 105*a*, whereas the same signal when fed directly to inhibitor 105*b* will enable the latter to pass the output pulse 103*a* from generator 103 to the "B" firing circuit 111. Thus the circuit 111 operates immediately to energize the gate pulse transformer 112 in order to simultaneously trigger the "B" thyristors in the matrix M. In response to this operation, another time delay circuit 113 is activated, and after the predetermined short time delay the circuit 113 feeds an operating pulse to the "A" firing circuit 108. Upon being shaped and amplified by the latter circuit, a delayed pulse is fed to the primary of transformer 109 and thence to the "A" thyristors which will thus be simultaneously triggered later than the "B" thyristors.

In the above-described triggering scheme, the flip-flop changes states once each cycle in synchronism with the light responsive pulse generator 103, whereby the group of thyristors which are triggered first on one cycle will be triggered last on the next successive cycle.

The triggering system of FIG. 3 is capable, with a slight modification, of providing gate pulses to matrix MM of FIG. 2. In that matrix the "A" thyristors in the turn-on path MM1 are always triggered prior to the "B" thyristors in the followup paths. Accordingly, since there is no need to alternate the thyristor firing order each cycle, logic circuit 104 is omitted. In that regard, when the triggering system shown in FIG. 3 is used to trigger matrix MM, the output of the light responsive pulse generator 103 is connected directly to the "A" firing circuit 108. As so connected, the pulse 103*a* generated by 103 is amplified and shaped by the firing circuit 108 from whence it is immediately supplied to the primary of the multisecondary gate pulse transformer 109. The four outputs of this transformer are connected to the gates of each of the "A" (first-on) thyristors shown in FIG. 2, thereby turning on such thyristors immediately in response to operation of the generator 103. At the same time the "A" firing circuit is operating, the time delay circuit 110 is activated whereupon, after the predetermined time delay, an operating pulse is fed to the "B" firing circuit 108 as previously described. This causes the gate pulse transformer 112 to supply delayed gate pulses simultaneously to all of the "B" thyristors in the matrix MM.

Since eight "B" thyristors are shown in FIG. 2, the schematically shown four output gate pulse transformer 112 will be inadequate to trigger all of those thyristors. Accordingly, this gate pulse transformer could be modified by adding four more secondary windings, although I prefer to utilize another four output gate pulse transformer in parallel with gate pulse transformer 112 to accomplish the same purpose. In that regard, a separate gate pulse transformer can be utilized for each followup path in the matrix MM.

While I have shown symbolically in FIG. 3 the time delay circuit 110 being activated in response to operation of the "A" firing circuit 108, it should be obvious that it can instead be activated directly by the light pulse generator 103, for which purpose the output pulse 103*a* would be supplied to both the firing circuit 108 and an input terminal Y of the time delay circuit 110. Alternatively, I contemplate generating a signal responsive to a sensed parameter in the "A" thyristors (i.e., voltage, current, etc.) that indicates they have just been triggered and passing this signal through input Y to time delay circuit 110. By sensing a parameter that indicates a desired state of conduction in the turn-on path MM1, the resulting signal can be used to initiate operation of the "B" firing circuit directly, in which case the signal would be supplied to an additional input lead Z, of the firing circuit 111 and the time delay circuit 110 would be omitted. It should therefore be apparent that the firing scheme shown in FIG. 3 has the attribute of simplicity while nevertheless being adaptable to a variety of specific embodiments.

While particular embodiments of my invention have been shown and described, it will be obvious to those skilled in the art that various changes and modifications may be made without departing from my invention in its broader aspects. I, therefore, intend to cover all such modifications as fall within the true scope and spirit of my invention.

What I claim as new and desire to secure by Letters Patent of the United States is:

1. In a high-voltage solid-state electric valve, a high-current switching matrix comprising:

a. a plurality of thyristors connected in at least first and second parallel paths for conducting current between opposite main electrodes of the matrix, each of said paths including at least two of said thyristors in series;
b. means for connecting a juncture of adjoining thyristors in said path to a juncture of adjoining thyristors in said second path;
c. a resistor-inductor subcircuit;
d. means for simultaneously triggering selected ones of said thyristors into conduction while forward voltage is impressed on the matrix;
e. means including said selected thyristors and said resistor-inductor subcircuit for forming between said electrodes a circuit which conducts the initial current that will flow through the matrix when said selected thyristors are turned on and which limits the magnitude of said initial current, said subcircuit being effective in said circuit to initially absorb and subsequently dissipate energy and to maintain sufficient voltage across the remaining thyristors of the matrix to ensure that they will commence conducting when subsequently triggered; and
f. means for triggering all of said remaining thyristors shortly after said selected thyristors are triggered, whereupon each of said first and second paths can conduct its proper share of the total current flowing through the matrix.

2. In a high voltage solid state electric valve, a high-current switching matrix comprising:

a. a plurality of thyristors connected in at least first and second parallel paths for conducting current between opposite main electrodes of the matrix, each of said paths including at least one of said thyristors;
b. a saturable core inductor serially connected in said first path;
c. said inductor being shunted by a resistor in series with a diode which is poled in opposition to the thyristor in said first path;
d. first means adapted for triggering the thyristor in said first path into conduction;
e. whereby, when the thyristor in said first path is turned on, the magnitude of current flowing in said first path is limited, transient current oscillations are suppressed, and sufficient voltage is maintained across the thyristor in said second path to ensure its conduction when subsequently triggered; and
f. second means adapted for triggering the thyristor in said second path after the thyristor in said first path is triggered, whereupon each of said first and second paths can conduct a portion of the total current flowing through the matrix.

3. The switching matrix as specified in claim 2 wherein a current balancing element is connected in said second path.

4. The switching matrix as specified in claim 3 wherein first and second paths are paralleled by a third current conducting path comprising at least one thyristor and another current balancing element and wherein said second means is adapted for triggering the thyristor in said third path substantially simultaneously with the thyristor in said second path.

5. The switching matrix as specified in claim 4 wherein each of said current balancing elements comprises an inductor which is shunted by a resistance element, and wherein the inductors in the respective paths are selected so that when all three paths are conducting and the inductor in the first path is saturated, each of said paths will conduct a predetermined share of the total current flowing through the matrix.

6. In a high-voltage solid-state electric valve, a high-current switching matrix comprising:

a. a plurality of thyristors connected in at least first, second and third parallel paths for conducting current between opposite main electrodes of the matrix, each of said paths including at least two of said thyristors in series;
b. a saturable core inductor connected in series with the two thyristors in said first path;
c. said inductor being shunted by a resistor in series with a diode which is poled in opposition to the thyristors in said first path;
d. at least two current balancing elements serially connected in said second and third paths, respectively;
e. first means adapted for substantially simultaneously triggering the thyristors in said first path into conduction;
f. whereby, when the thyristors in said first path are turned on, the magnitude of current flowing in said first path is limited, transient current oscillations are suppressed, and sufficient voltage is maintained across the thyristors in said second path and said third path to ensure that they will conduct when subsequently triggered; and
g. second means adapted for substantially simultaneously triggering the thyristors in said second and third paths into conduction after the thyristors in said first path are triggered, whereupon each of said first, second and third paths conducts current between said main electrodes.

7. The switching matrix as specified in claim 6 wherein each of said current balancing elements comprises an inductor, and wherein resistance elements are provided in shunt with each of said current balancing inductors.

8. The switching matrix as specified in claim 7 wherein said saturable core inductor is disposed between the two thyristors in said first path, and wherein a resistance means is connected between the first-mentioned resistor and a juncture of adjoining thyristors in said second path, and wherein another resistance means is connected between said first-mentioned resistor and a juncture of adjoining thyristors in said third path.

9. The switching matrix as specified in claim 8 wherein the inductors in the respective paths are selected so that when all three paths are conducting and the inductor in the first path is saturated, each of said paths will conduct a predetermined share of the total current flowing through the matrix.

10. In a high-voltage solid-state electric valve, a high-current switching matrix comprising:

a. a plurality of thyristors connected in first and second parallel paths for conducting load current between opposite main electrodes of the matrix, each of said paths including at least two of said thyristors in series;
b. a resistor-inductor subcircuit connected between a juncture of adjoining thyristors in said first path and a corresponding juncture of adjoining thyristors in second path;
c. first means operative to trigger one of said two thyristors in said first path and substantially simultaneously to trigger one of said two thyristors in said second path, said simultaneously triggered thyristors and said subcircuit being interconnected to form between said electrodes a circuit which conducts the initial current that flows through the matrix when said simultaneously triggered thyristors are turned on and which limits the magnitude of said initial current, said subcircuit being effective in said circuit to initially absorb and subsequently dissipate energy and to maintain sufficient voltage across the remaining thyristors of the matrix to ensure that they will commence conducting when subsequently triggered; and
d. second means operative to trigger said remaining thyristors in unison after said first means operates, whereupon each of said first and second paths can conduct its proper share of the total current flowing through the matrix.

11. The switching matrix as specified in claim 10 wherein said resistor-inductor subcircuit comprises a resistor in series with an inductor.

12. The switching matrix as specified in claim 11 wherein said inductor has a saturable core.

13. The switching matrix as specified in claim 12 wherein each of said paths additionally comprises a current balancing inductor and a resistor in parallel therewith.

14. The switching matrix as claimed in claim 12 wherein said main electrodes are adapted to be connected to an alternating voltage electric power system and wherein during one cycle of said voltage said first means operates prior to said second means whereas during the next successive cycle said second means operates prior to said first means.

15. The switching matrix as specified in claim 14 wherein each of said paths additionally comprises a current balancing inductor and a resistor in parallel therewith.

16. In a high-voltage solid-state electric valve, a high-current switching matrix comprising:

a. a plurality of thyristors connected in first and second parallel paths for conducting load current between opposite main electrodes of the matrix, each of said paths comprising a first thyristor serially connected to a second thyristor at a first point, a third thyristor serially connected to said second thyristor at a second point, and a fourth thyristor serially connected to said third thyristor at a third point;

b. a resistor-inductor subcircuit connected between the first point in the first path and the first point in the second path;

c. means for connecting the second point in the first path to the second point in the second path;

d. another resistor-inductor subcircuit connected between the third point in the first path and the third point in the second path;

e. first means operative for substantially simultaneously triggering said first and third thyristors in the first path and said second and fourth thyristors in said second path;

f. second means operative to trigger, substantially in unison, said first and third thyristors in the second path and said second and fourth thyristors in the first path after said first means operates.

17. The switching matrix as specified in claim 16 wherein each of said resistor-inductor subcircuits comprises a resistor in series with an inductor.

18. The switching matrix as specified in claim 17 wherein each inductor has a saturable core.

19. The switching matrix as specified in claim 18 wherein said saturable core inductors share a common core.

20. The switching matrix as specified in claim 18 wherein said main electrodes are adapted to be connected to an alternating voltage electric power system and wherein during one cycle of said voltage said first means operates prior to said second means whereas during the next successive cycle said second means operates prior to said first means.

21. The switching matrix as specified in claim 20 wherein said saturable core inductors share a common core.

22. The switching matrix as specified in claim 21 wherein current balancing inductors are provided in each of said paths and wherein resistors are provided in shunt with each of said current balancing inductors.

* * * * *